Patented Sept. 23, 1941

2,257,082

UNITED STATES PATENT OFFICE 2,257,082

TREATMENT OF HYDROCARBONS

Willis A. Yarnall, Beacon, N. Y., assignor to The Texas Company, New York, N. Y., a corporation of Delaware No Drawing. Application March 18, 1939, Serial No. 262,783

1 Claim. (Cl. 260—683)

This invention relates to the dehydrogenation of hydrocarbons and has to do more particularly with the catalytic dehydrogenation of hydrocarbons in the presence of carbon monoxide.

The invention comprises the vapor phase treatment of normally gaseous hydrocarbons heavier than methane, and normally liquid hydrocarbons falling within about the gasoline boiling point range, under temperature and pressure conditions suitable for dehydrogenation with a dehydrogenation catalyst, in the presence of a substantial amount of carbon monoxide to increase the proportion of olefins formed and to retard the formation of aromatics and carbonaceous materials which poison the catalyst.

It has been known heretofore that hydrocarbons may be dehydrogenated with certain catalysts at relatively high temperatures, but there is usually substantial carbon formation which impairs the catalyst, whereby it is necessary to regenerate the catalyst at intervals by burning off the carbon. Furthermore, when dehydrogenating normally liquid hydrocarbons, it is difficult to arrest the reaction at the olefin stage with the result that the olefins cyclize into aromatics, which under some conditions tend to depreciate unduly in antiknock value.

It has now been found that the above difficulties may be appreciably overcome by conducting the dehydrogenation operation in the presence of added carbon monoxide. The amount of carbon formation may be substantially depressed by the presence of carbon monoxide in the reaction mixture, whereby the life of the catalyst may be materially improved. Also the proportion of olefins in the reaction products is increased, and the proportion of aromatics decreased, as compared with similar operations carried out in the absence of carbon monoxide. It is intended, moreover, that the carbon monoxide react with the hydrogen split from the hydrocarbons to form reduction products such as valuable hydrocarbons and water, whereby the equilibrium is shifted to favor the dehydrogenation reaction and the yield of desired products increased. In some cases the latter objectives may be more fully realized by using certain mixtures of catalysts as described below.

The hydrocarbons which are intended to be treated are normally gaseous hydrocarbons of 2 to 4 carbon atoms, preferably propane or butane or mixtures thereof; normally liquid hydrocarbons suitable for motor fuel manufacture, such as gasolines or naphthas, preferably low boiling naphthas or the individual hydrocarbons thereof, for example, pentane, hexane, heptane, octane, nonane, decane and the like; and mixtures of any or all of the above normally gaseous and normally liquid hydrocarbons.

The catalysts useful for the process comprise a large number of more or less active dehydrogenation agents. It is desirable to use a solid material of relatively high activity such as natural or artificial adsorptive solids and gels. The oxides of group VI of the periodic table alone or associated with oxides of the metals of groups III and IV may be used. Specific catalysts contemplated are bauxite; activated alumina; chromic oxide gel; active alumina coprecipitated or impregnated with chromic oxide; activated alumina-chrome oxides and an alkali, such as potassium hydroxide; and activated alumina together with chromic acid or an alkali bichromate. In the above examples the aluminum may be replaced by other metals, such as zirconium, and the chromium by other metals, such as molybdenum. An advantage may be obtained by using in conjunction with any of the catalysts specified, another catalyst comprising the oxides of cobalt, magnesium and thorium, to promote the interaction between the carbon monoxide and hydrogen. In the latter type of catalyst, the cobalt oxide may be about 86 to 87%, the magnesium oxide about 8 to 10% and the thorium oxide about 4 to 5%. With the mixed catalysts it may be desirable to use temperatures somewhat lower than 400° C., for example as low as about 300° or 350° C.

The operating conditions may be those ordinarily employed in dehydrogenation. The pressures are usually low, such as atmospheric or slightly above. In some cases moderate pressures up to about 400 lbs. may be useful. The temperatures may range from about 400° to 600° C. and preferably about 450° to 575° C. Flow rates of about ½ to 1½ liquid volumes of feed per volume of catalyst per hour are satisfactory.

The amount of carbon monoxide used may vary considerably. For purposes of illustration and without restricting the invention to any specific amounts, it is prescribed that about ⅓ to 2 mols of carbon monoxide to one mol of hydrocarbon be used. The temperature, type of hydrocarbon charge, and degree of conversion desired, will ordinarily determine the amount of carbon monoxide. The amount may advantageously be such that the proportion of carbon monoxide and hydrogen produced is favorable for interaction therebetween to form synthetic hydrocarbons, such as a ratio of hydrogen to carbon monoxide of about 2:1 by volume.

The invention may be further disclosed by the following example, which is given for illustrative purposes only.

A mixture, containing about 1 mol of carbon monoxide to 3 mols of heptane was passed, at about 510° C. and a flow rate of about ¾ volume of liquid feed per volume of catalyst per hour, over an active chrome-alumina catalyst comprising about 90% active alumina and 10% chromium oxide. The product contained 18% heptene and 6% toluene. The carbon formation was less than 1%. The same process without the addition of carbon monoxide yielded about 9% heptene, 15% toluene and the carbon formation was 4%.

Obviously many modifications and variations of the invention, as hereinbefore set forth, may be made without departing from the spirit and scope thereof, and therefore only such limitations should be imposed as are indicated in the appended claim.

I claim:

A process for the dehydrogenation of normally gaseous hydrocarbons of 2 to 4 carbon atoms and low boiling normally liquid hydrocarbons, to form olefins, which comprises contacting the hydrocarbons at low pressures and at temperatures of about 350° C. to 600° C. in the vapor phase and in the presence of a substantial amount of carbon monoxide, with a mixture of catalysts including a dehydrogenation catalyst comprising a mixture of aluminum and chromium oxides and a catalyst strongly promoting the interaction of carbon monoxide and hydrogen comprising a mixture of the oxides of cobalt, magnesium and thorium.

WILLIS A. YARNALL.